United States Patent [19]

Fajt et al.

[11] Patent Number: 4,462,518

[45] Date of Patent: Jul. 31, 1984

[54] APPARATUS AND METHODS FOR HANDLING ELECTRICAL COMPONENTS

[75] Inventors: John Fajt; James V. Neal, Jr., both of Wynnewood, Okla.

[73] Assignee: Xenell Corporation, Wynnewood, Okla.

[21] Appl. No.: 405,585

[22] Filed: Aug. 5, 1982

Related U.S. Application Data

[62] Division of Ser. No. 186,589, Sep. 12, 1980, Pat. No. 4,454,941.

[51] Int. Cl.$^3$ .............................................. B65G 47/86
[52] U.S. Cl. .................................... 198/479; 198/696; 294/100
[58] Field of Search ................ 294/100, 116; 198/479, 198/694, 695, 696, 486

[56] References Cited

U.S. PATENT DOCUMENTS

| | | |
|---|---|---|
| 477,093 | 6/1892 | Wead . |
| 1,208,846 | 12/1916 | Sheldon et al. . |
| 1,453,493 | 5/1923 | Cunningham . |
| 1,611,923 | 12/1926 | Leonard .............................. 294/100 |
| 1,646,258 | 10/1927 | Raus et al. . |
| 1,861,271 | 5/1932 | Herre . |
| 2,121,665 | 6/1938 | Hudson . |
| 2,137,181 | 11/1938 | Quackenbush . |
| 2,203,151 | 6/1940 | Iversen . |
| 2,207,649 | 7/1940 | Williams et al. . |
| 2,379,135 | 6/1945 | Ekstedt et al. . |
| 2,449,505 | 9/1948 | Pityo et al. . |
| 2,454,338 | 11/1948 | Pityo et al. . |
| 2,459,625 | 1/1949 | Copp . |
| 2,477,894 | 8/1949 | Pityo et al. . |
| 2,493,560 | 1/1950 | Vasselli . |
| 2,578,835 | 12/1951 | Pityo et al. . |
| 2,605,537 | 8/1952 | Pityo et al. . |
| 2,606,268 | 8/1952 | Pityo et al. . |
| 2,644,069 | 6/1953 | Pityo . |
| 2,734,119 | 2/1956 | Pityo . |
| 2,749,420 | 6/1956 | Pityo . |
| 2,776,037 | 1/1957 | Baigent . |
| 2,784,297 | 3/1957 | Pityo . |
| 2,798,514 | 7/1957 | Mullan .............................. 140/71.5 |

(List continued on next page.)

FOREIGN PATENT DOCUMENTS

52-29078 3/1977 Japan .
197706 6/1977 U.S.S.R. .

OTHER PUBLICATIONS

Publication of Kahle Engineering Company of Union City, New Jersey, Machine Number 4719, Automatic Stem Machine.
Publication of Kahle Engineering Company of Union City, New Jersey, Machine Number 2545, Automatic Pinch Seal Stem Machine.
Publication of Kahle Engineering Company of Union City, New Jersey, Machine Number 4318, Neon Glow Lamp Production Machine.
Publication of Kahle Engineering Company of Union City, New Jersey, Machine Number 15-B, Twenty-four Head Exhaust Machine with Short Compressible Rubbers.
Publication of Kahle Engineering Company of Union City, New Jersey, Brochure No. 6903, entitled "Kahle Specialists in Automation for All Industries".
Publication of Kahle Engineering Company of Union City, New Jersey, Bulletin REP 70.
Publication of Kahle Engineering Company of Union City, New Jersey, Reprint from Automation, Sep. 1971, entitled "Combining Processing and Assembly Operations", by Carl A. Napor.
Publication of Kahle Engineering Company of Union City, New Jersey, Reprint from Instrumentation, vol. 7, No. 6, entitled "Slick Little Switch".

Primary Examiner—Joseph E. Valenza
Assistant Examiner—Dennis J. Williamson
Attorney, Agent, or Firm—Laney, Dougherty, Hessin & Beavers

[57] ABSTRACT

A pair of conically tapered rollers orients and positions a plurality of initially randomly oriented negative glow lamps. A component holder receives said oriented and positioned lamps sequentially one at a time and releasably holds said lamps in a fixed position relative thereto as the lamps are moved laterally away from the rollers.

7 Claims, 26 Drawing Figures

U.S. PATENT DOCUMENTS

| Number | Date | Name | Ref |
|---|---|---|---|
| 2,828,998 | 4/1958 | Seelye | 294/100 |
| 2,846,561 | 8/1958 | Pityo . | |
| 2,848,793 | 8/1958 | Pityo . | |
| 2,915,616 | 12/1959 | Griffin . | |
| 2,916,056 | 12/1959 | O'Brien et al. . | |
| 3,003,051 | 10/1961 | Kulicke, Jr. et al. . | |
| 3,003,052 | 10/1961 | Williams et al. . | |
| 3,005,900 | 10/1961 | Pityo . | |
| 3,045,739 | 7/1962 | Fyfe et al. . | |
| 3,059,321 | 10/1962 | Pityo . | |
| 3,071,166 | 1/1963 | Gutbier . | |
| 3,075,562 | 1/1963 | Jankowski . | |
| 3,079,958 | 3/1963 | Helda . | |
| 3,101,866 | 8/1963 | Anderson . | |
| 3,106,945 | 10/1963 | Wright et al. . | |
| 3,126,087 | 3/1964 | Anderson . | |
| 3,144,889 | 8/1964 | Cole . | |
| 3,195,584 | 7/1965 | Zimmerman et al. . | |
| 3,220,443 | 11/1965 | Smith et al. . | |
| 3,220,443 | 11/1965 | Smith et al. . | |
| 3,225,797 | 12/1965 | Stoody . | |
| 3,258,830 | 7/1966 | Pityo . | |
| 3,291,168 | 12/1966 | Zitner . | |
| 3,294,948 | 12/1966 | Fegley et al. . | |
| 3,297,130 | 1/1967 | Greck . | |
| 3,300,617 | 1/1967 | Buck et al. . | |
| 3,319,668 | 5/1967 | Shambelan . | |
| 3,321,606 | 5/1967 | Cropp et al. . | |
| 3,321,825 | 5/1967 | Cooke . | |
| 3,337,257 | 8/1967 | Brynsvold . | |
| 3,344,816 | 10/1967 | Zemek . | |
| 3,352,331 | 11/1967 | Swyt . | |
| 3,365,048 | 1/1968 | Ehrlich et al. . | |
| 3,396,758 | 8/1968 | Hall . | |
| 3,479,712 | 11/1969 | Pityo . | |
| 3,517,157 | 6/1970 | Best et al. . | |
| 3,520,336 | 7/1970 | Zemek . | |
| 3,537,276 | 11/1970 | Pityo . | |
| 3,542,087 | 11/1970 | Fegley . | |
| 3,567,006 | 3/1971 | Bell et al. . | |
| 3,612,254 | 10/1971 | Wideman . | |
| 3,675,755 | 7/1972 | Hopwood-Jones . | |
| 3,687,263 | 8/1972 | Randrup . | |
| 3,720,435 | 3/1973 | Leyn . | |
| 3,747,737 | 7/1973 | Brooke | 198/479 X |
| 3,778,584 | 12/1973 | Fajt et al. . | |
| 3,815,730 | 6/1974 | Zwiep et al. . | |
| 3,837,472 | 9/1974 | Byerly . | |
| 3,850,286 | 11/1974 | Tobin, Jr. . | |
| 3,935,773 | 2/1976 | Daebler . | |
| 3,941,165 | 3/1976 | Bowden et al. . | |
| 3,964,778 | 6/1976 | Jouppi . | |
| 3,977,079 | 8/1976 | Rebold . | |
| 4,002,191 | 1/1977 | Lorenzini . | |
| 4,024,614 | 5/1977 | Utterback et al. . | |
| 4,049,414 | 9/1977 | Smith . | |
| 4,094,410 | 6/1978 | Fegley et al. . | |
| 4,159,762 | 7/1979 | Bulwith | 198/653 X |
| 4,257,639 | 3/1981 | Stock . | |

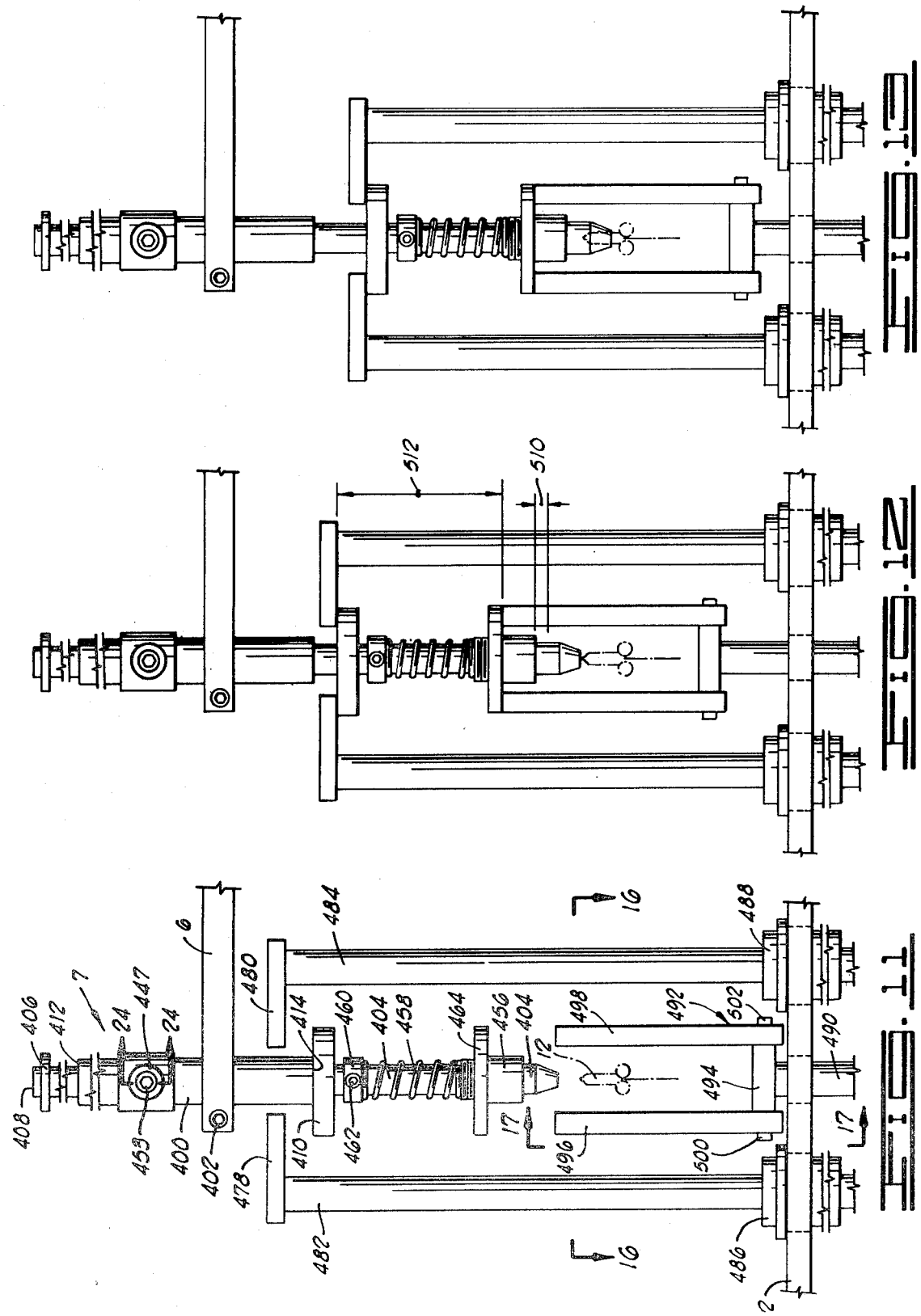

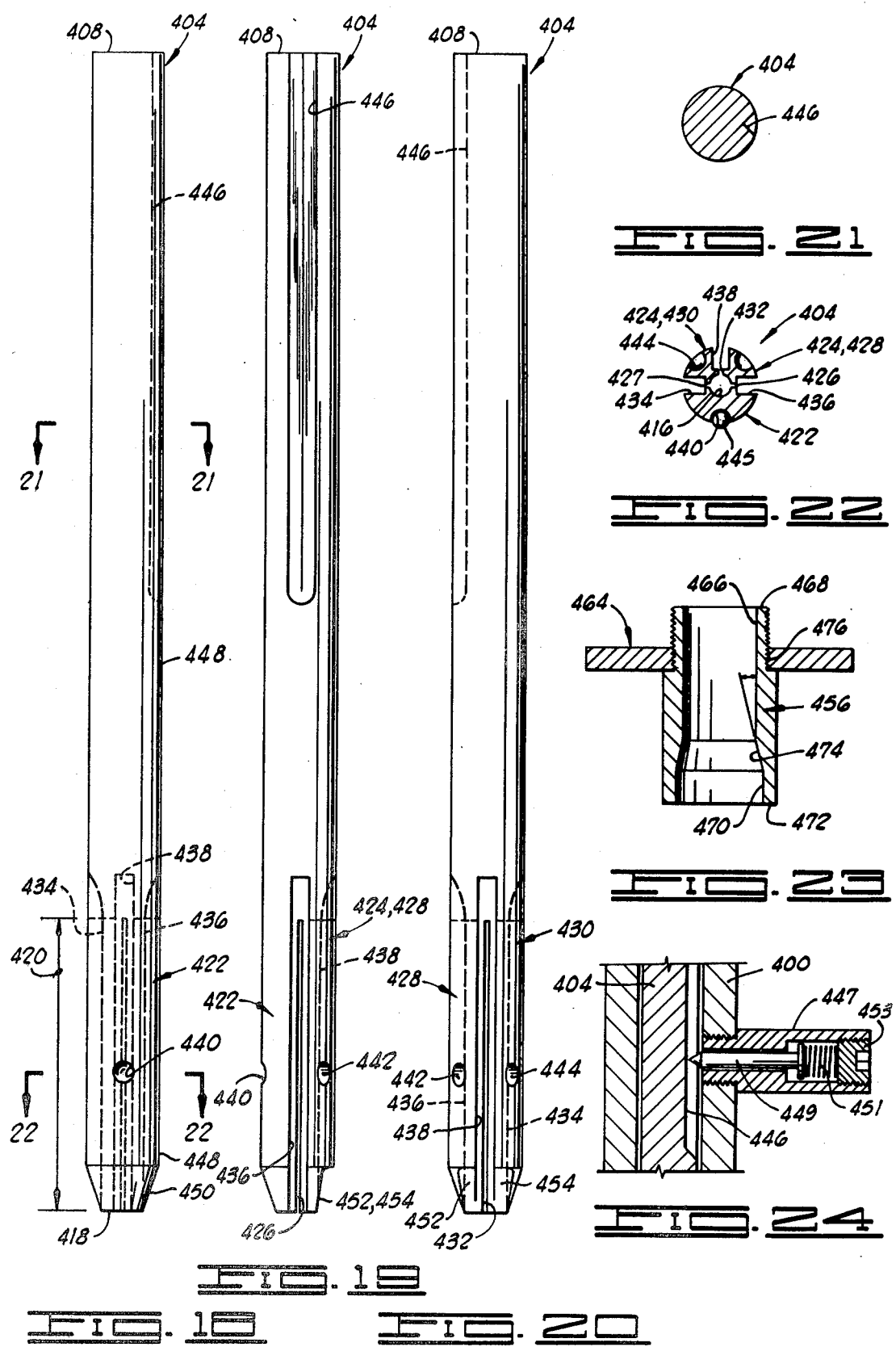

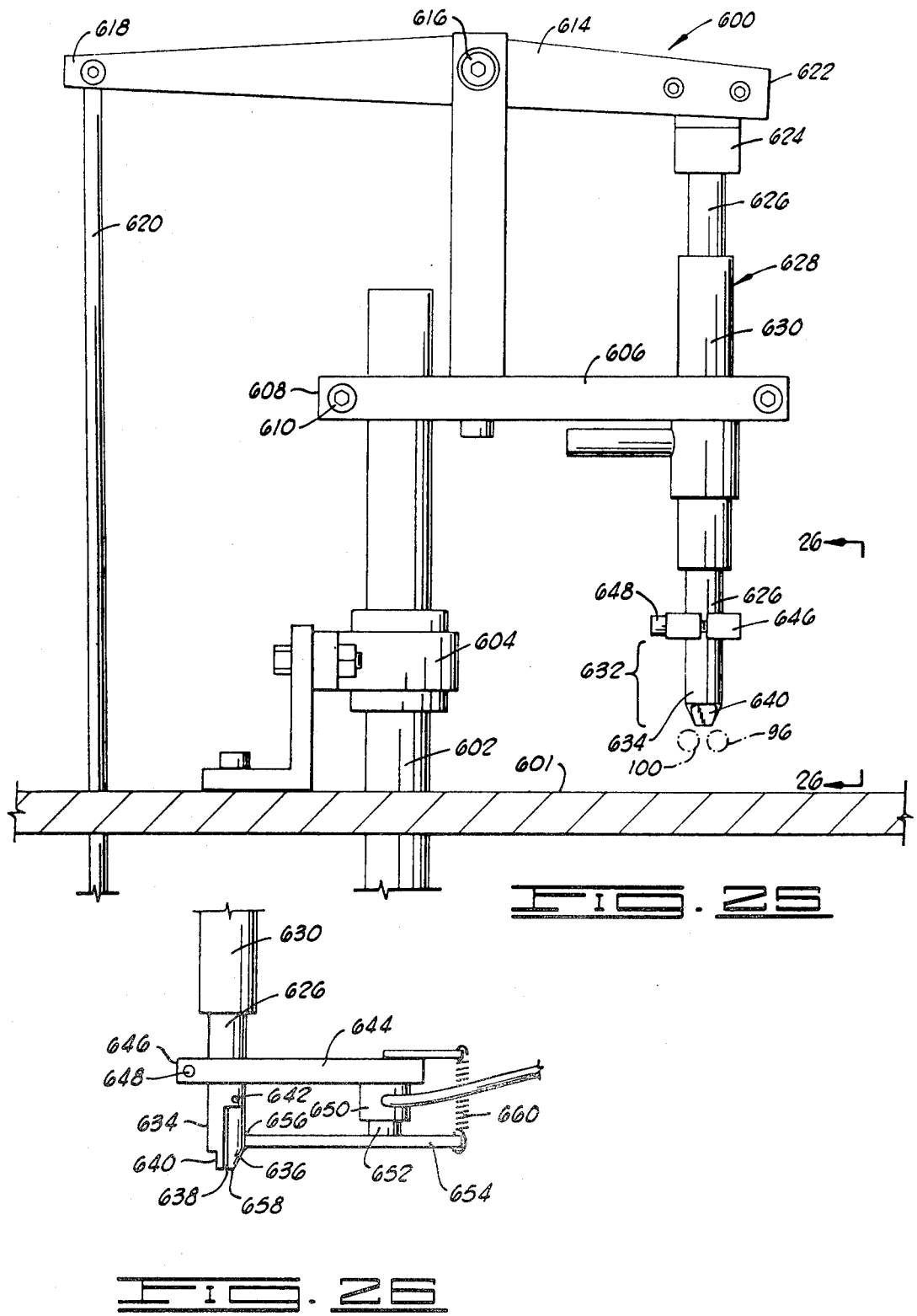

APPARATUS AND METHODS FOR HANDLING ELECTRICAL COMPONENTS

This application is a division of application Ser. No. 186,589, filed Sept. 12, 1980, now U.S. Pat. No. 4,454,941.

BACKGROUND OF THE INVENTION

1. Brief Description of the Invention

The present invention relates generally to apparatus and methods for handling electrical components, and more particularly, but not by way of limitation, to apparatus and methods for handling negative glow lamps.

2. Description of the Prior Art

A negative glow lamp is an electrical component having a cylindrical glass bulb approximately ½" in length and ¼" in diameter. Extending downwardly from the bulb is a lower bulb portion which is a substantially flat tab formed during the bulb manufacturing process. This lower bulb portion extends downward approximately ¼" and has a width of approximately ¼", and a thickness of approximately 1/16". Disposed within the bulb are first and second filaments. Attached to the first and second filaments and extending downwardly from the lower bulb portion are first and second copper lead wires having a length of approximately 1½". These lead wires are substantially parallel and lie substantially in the plane of the flat tab extending down from the bulb.

Such negative glow lamps are used in large numbers by manufacturers of electrical equipment. Various modifications are often made to the lamps such as custom trimming of the lead wires to a specific length and/or the welding of a resistor to one of the lead wires.

Prior art methods of handling such negative glow lamps during the processes of testing the glow lamps, trimming the lead wires on the glow lamps, and/or welding resistors to the glow lamps, have involved the manual handling of each individual lamp at numerous stages in the processes. This adds greatly to the expense of manufacturing the finished lamps.

In order to automate these processes, it is necessary to provide a means for initially positioning each of the lamps at a specific predetermined location in space with a specific predetermined angular orientation. A lamp holding means may then receive each of said lamps one at a time in an identical manner and then carry each of the lamps through the steps of an automated system for separating, trimming or otherwise manipulating the lead wires of the lamps.

The present invention provides apparatus and methods for achieving such positioning, and for then receiving the lamps and moving them through the various steps of the automated system.

SUMMARY OF THE INVENTION

First and second substantially horizontally extending conically tapered rollers are rotatably mounted upon a frame with edges of said rollers closest to each other arranged parallel to each other and spaced apart so that electrical components may be received therebetween and may be engaged with and supported by both of said rollers. This structure provides apparatus and methods for mechanically positioning in sequence at a predetermined position, a plurality of electrical components of the type having a body with first and second lead wires extending therefrom. The predetermined position includes a predetermined location in space and a predetermined angular orientation so that the lead wires extend downward from the body of the electrical component and are spaced apart in a direction parallel to a predetermined horizontal line extending parallel to the inner edges of the rollers. A lamp holder receives the lamps sequentially one at a time when the lamps are positioned at said predetermined position between said first and second rollers adjacent smaller ends thereof. The lamps are releasably held by the lamp holder.

It is therefore, a general object of the present invention to provide improved apparatus and methods for handling electrical components.

Another object of the present invention is the provision of improved apparatus and methods for handling negative glow lamps.

And another object of the present invention is the provision of a pair of rotating tapered conical rollers for orienting and locating electrical components, and a component holder for receiving the components one at a time from said rollers.

Yet another object of the present invention is the provision of apparatus and methods for vertically orienting negative glow lamps, and for receiving and releasably holding said oriented lamps.

Other and further objects, features and advantages of the present invention will be readily apparent to those skilled in the art upon a reading of the following disclosure when taken in conjunction with the accompanying drawings.

BRIEF DESCRIPTION OF THE DRAWINGS

FIGS. 11–15 are a sequential series of elevation views of a lamp holder being actuated to pick up a lamp from between the rollers of FIGS. 3 and 4.

FIG. 18 is a front elevation view of a center rod of the lamp holder, as seen in FIG. 11.

FIG. 19 is another elevation view of the center rod of FIG. 18, rotated 90° clockwise as viewed from above.

FIG. 20 is another elevation view of the center rod of FIG. 18 rotated an additional 90° clockwise relative to the view of FIG. 19.

FIG. 21 is a section view along line 21—21 of FIG. 18.

FIG. 22 is a section view along line 22—22 of FIG. 18.

FIG. 23 is a section elevation view of a cam sleeve of the lamp holder.

FIG. 24 is a section elevation view along line 24—24 of FIG. 11, showing a frictional engagement means for engaging the center rod of FIG. 18.

FIG. 25 is a left side elevation view of an alternative lamp holder attached to a moving means.

FIG. 26 is a partial elevation view along line 26—26 of FIG. 25 showing an air cylinder actuating mechanism of the lamp holder of FIG. 25.

DETAILED DESCRIPTION OF THE PREFERRED EMBODIMENTS

Figure 1:
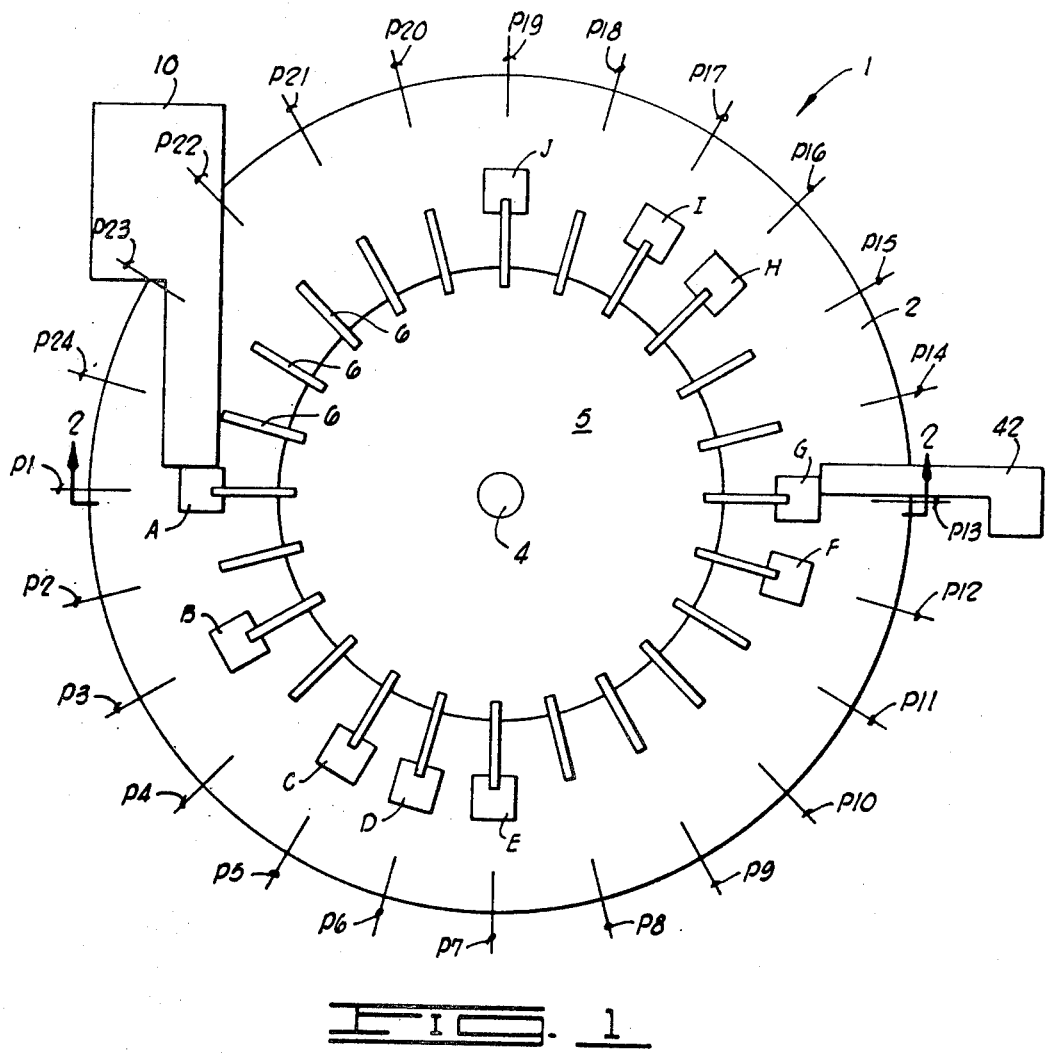
FIG. 1 is a schematic plan view of an automatic welding turntable of which the lamp handling apparatus of the present invention is a part.
Figure 2:
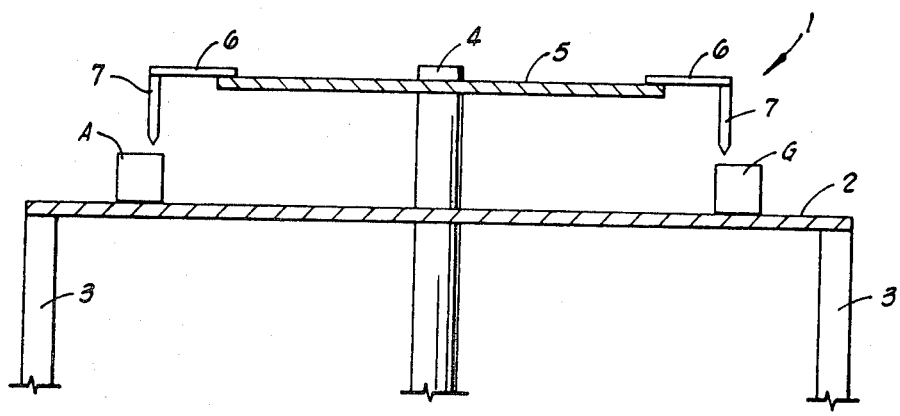
FIG. 2 is a schematic elevation view of the automatic welding turntable of FIG. 1 taken along line 2—2 of FIG. 1.

The Automatic Welding Turntable of FIGS. 1 & 2

Referring now to FIG. 1, an automatic welding turntable assembly is shown and generally designated by the numeral 1. The turntable assembly 1 includes a fixed circular table frame 2 supported from a ground surface by a structural frame 3 (see FIG. 2). Extending upward from the center of table frame 2 is a rotatable shaft 4. Attached to the shaft 4 for rotation therewith is a circular turret frame or indexing plate 5.

Extending radially outward from indexing plate 5 are twenty-four equally angularly spaced indexing arms 6. Thus, adjacent indexing arms 6 are separated by an angle of 15°.

Attached to the rotatable shaft 4 is a drive means (not shown) which provides a means for periodically rotating the shaft 4 through an angle of 15° in a counterclockwise direction as viewed in FIG. 1, then holding rotatable shaft 4 fixed for a period of time, then rotating shaft 4 through a second angle of 15°, then stopping again, etc. Thus, it takes twenty-four steps for any one of the indexing arms 6 to make a complete revolution relative to the table frame 2.

At any given time at which the rotatable shaft 4 is stopped, the indexing arms 6 are oriented as shown in FIG. 1 relative to the table frame 2.

Twenty-four angular positions of the indexing arms 6 relative to the table frame 2 are defined on the table frame 2 and are indicated by angular positions P1–P24 shown in FIG. 1.

Each of the indexing arms 6 includes a lamp holder means 7, as shown schematically in FIG. 2.

Figure 3:
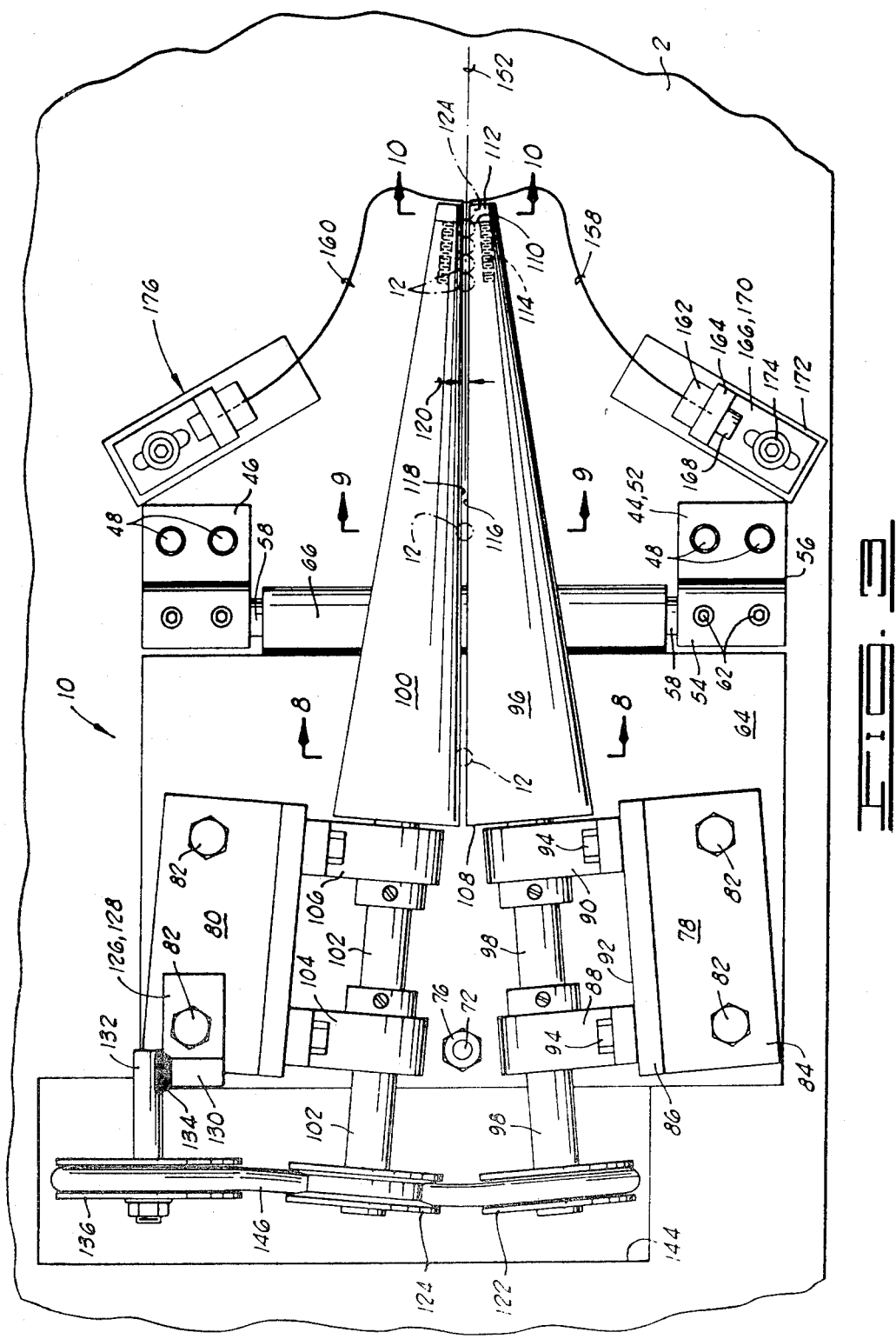
FIG. 3 is a plan view of a lamp positioning roller assembly.
Figure 4:
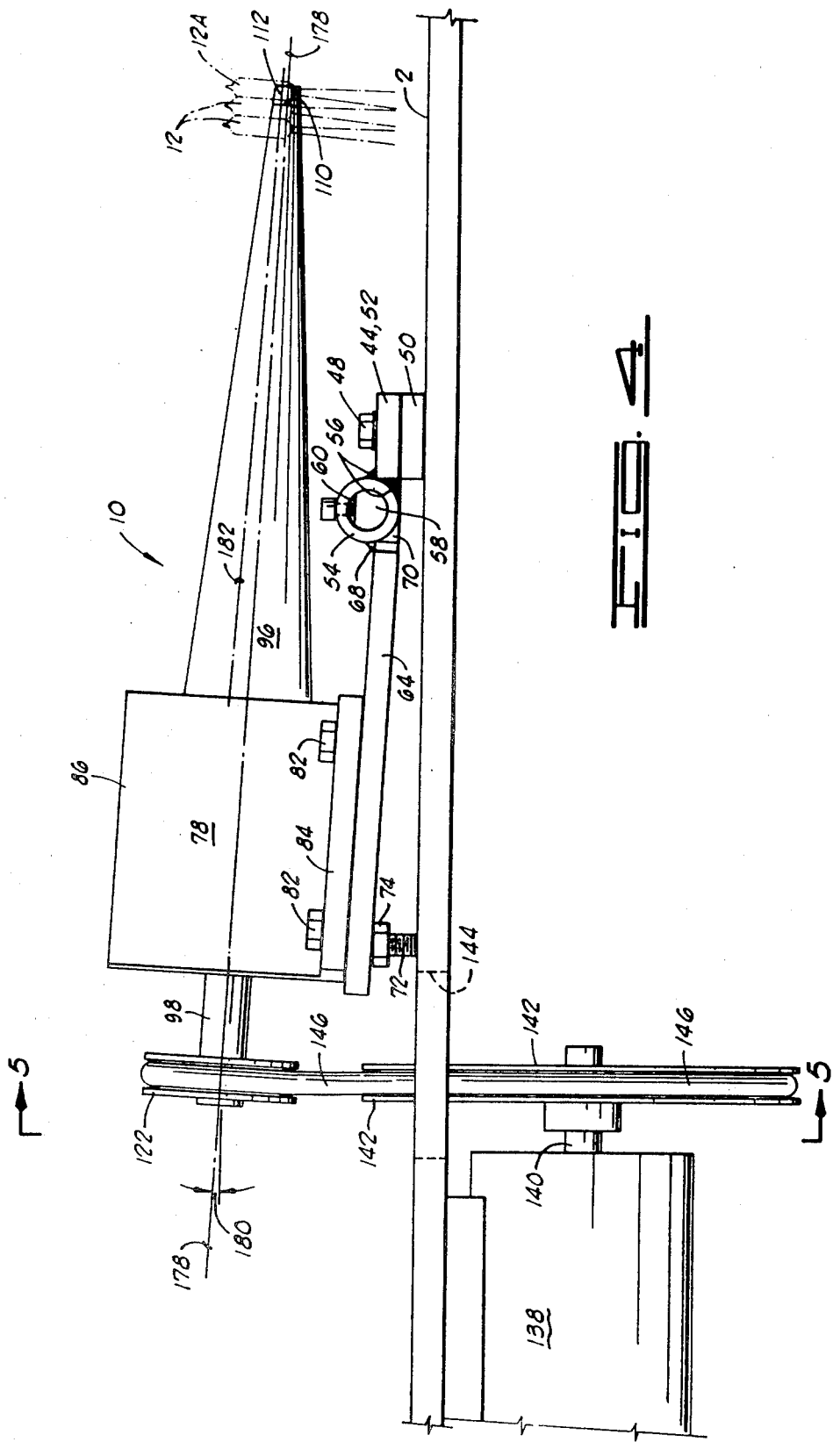
FIG. 4 is a side elevation view of the apparatus of FIG. 3.
Figure 5:
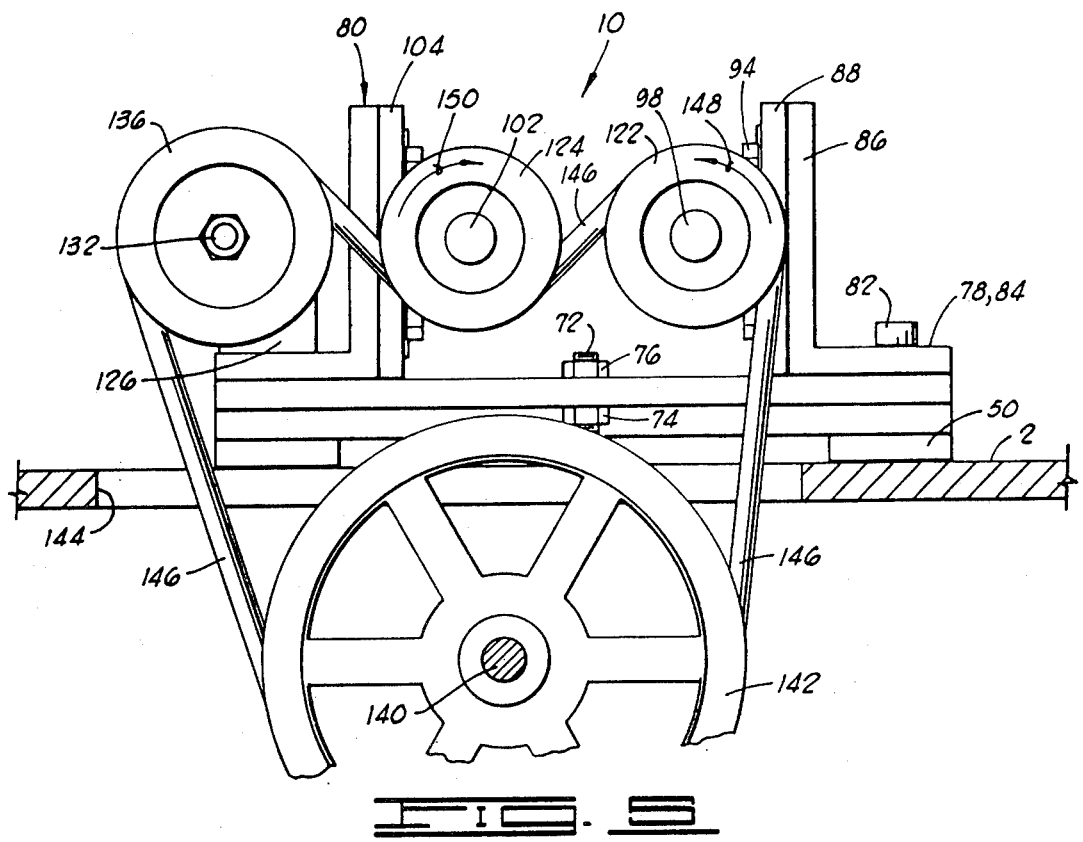
FIG. 5 is a rear elevation view of the apparatus of FIGS. 3 and 4 taken along line 5—5 of FIG. 4.

Referring now to FIGS. 3–5, a lamp positioning roller assembly, which may generally be referred to as a system for positioning negative glow lamps, is shown and generally designated by the numeral 10.

Figures 6, 7:
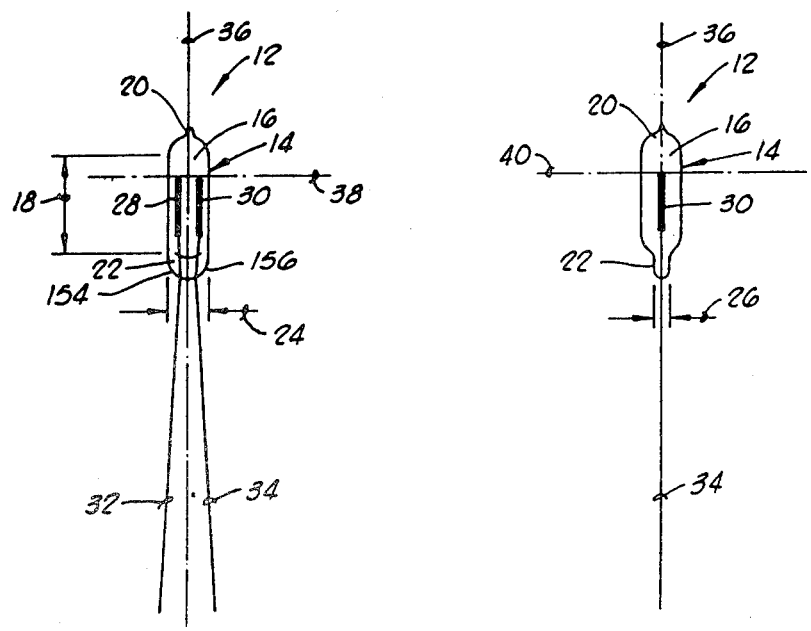
FIG. 6 is a side elevation view of a negative glow lamp with the plane of the paper being defined by the first and second body axes of the negative glow lamp.
FIG. 7 is a side elevation view of the negative glow lamp of FIG. 6, rotated 90°, clockwise as viewed from above about its first body axis, so that the plane of the paper is defined by the first and third body axes of the negative glow lamp.

Referring to FIGS. 6 and 7, a negative glow lamp 12, which may generally be referred to as an electrical component, is thereshown. The negative glow lamp 12, which itself is well known in the prior art, will now be described for purposes of reference. The negative glow lamp 12 includes a bulb 14. The bulb 14 has a cylindrical portion 16 having a length 18 of approximately ½". The cylindrical portion 16 has an outside diameter, which is its greatest minimum cross sectional dimension, of approximately ¼". It will be understood that for any section cut through the bulb 14 perpendicular to its longitudinal axis there will be a minimum cross sectional dimension. The greatest of these minimum cross sectional dimensions determines the smallest width of a slot through which the bulb 14 could pass.

At the upper end of cylindrical part 16 is a roughly conical closed tip 20 which is formed during the bulb manufacturing process.

Extending downward from the lower end of cylindrical part 16 is a flat bottom bulb portion 22 which closes the bottom of hollow cylindrical part 16. Flat bottom bulb portion 22 has a width 24 of approximately ¼" and has a thickness 26, as can best be seen in FIG. 7, of approximately 1/16".

Received within bulb 14 are first and second filaments 28 and 30. The filaments 28 and 30 are substantially parallel and spaced apart as can be seen in FIG. 6. Attached to filaments 28 and 30 are first and second lead wires 32 and 34 which extend therefrom downward through the flat bulb portion 22. Lead wires 32 and 34 extend downward a length of approximately 1½" below bulb 14. The lead wires 32 and 34 are encased in lower part 22 of bulb 14 where they pass therethrough and are substantially parallel to each other and lie within the plane of filaments 28 and 30 and the plane of lower bulb portion 22. It will be understood by those skilled in the art, that the lead wires 32 and 34 will, of course, often be slightly bent away from each other or out of the plane of FIG. 6. The construction of the lamp 12 is, however, such that if the lead wires 32 and 34 are not deformed, but rather extend axially from the filaments 28 and 30, they will be substantially parallel to each other and lie in the plane of flat bottom bulb portion 22 and in the plane of filaments 28 and 30.

This is further illustrated in FIG. 7, in which lamp 12 is rotated 90° about a vertical axis from the view shown in FIG. 6, so that only the second filament 30 and the second lead wire 34 are shown.

The geometric configuration of the lamp 12 may best be described by defining first, second and third mutual perpendicular body axes of the lamp 12. Those axes, which will be understood as being imaginary axes, are defined as follows.

A longitudinal axis through cylindrical part 16 of lamp bulb 14 is defined as a first body axis 36. Perpendicular to axis 36 and lying within a plane defined by filaments 28 and 30 and lower flat bulb portion 22 is a second body axis 38. The axes 36 and 38 define the plane of the paper on which FIG. 6 is drawn.

A third body axis 40 is perpendicular to both said first and second axes 36 and 38 and may be seen in FIG. 7 where the axes 36 and 40 define the plane of the paper on which FIG. 7 is drawn.

As can be seen in FIG. 6, the first and second lead wires 32 and 34 extend from lower bulb portion 22 substantially parallel to first body axis 36 and spaced apart in a direction parallel to second axis 38.

Referring again to FIG. 1, at several of the angular positions upon table frame 2 work stations A–J are defined for performing various operations on a negative glow lamp 12 as it is carried around the automatic welding turntable 1 by one of the lamp holders 7.

At work station A, lamps 12 are fed to a predetermined position in space by the lamp positioning assembly 10 and at work station A each of the lamps is picked up by one of the lamp holders 7.

At work station B an apparatus is provided for separating the lead wires 32 and 34 and trimming the second lead wire 34 to a predetermined length.

Additional operations performed at work stations C through J adjust the vertical position of the lamp holder 7 at work station C, trim the length of the first lead wire 32 at work station D, straighten the second lead wire 34 at work station E, sense the presence of the lamp 12 at work station F, weld a resistor to second lead wire 34 at work station G, trim the length of a second resistor lead wire at work station H, test the physical strength of the weld at work station I, and release the lamp 12 at work station J.

At work station G a resistor feeder means 42 also feeds resistors to the welding machine at work station G.

The Positioning Rollers of FIGS. 3-5

Referring to FIGS. 3 and 4, the lamp positioning roller assembly is thereshown and generally designated by the numeral 10. Roller assembly 10 is mounted upon the table frame 2. First and second roller attachment hinges 44 and 46 are attached to table frame 2 by allen screws 48. The table frame 2 is threaded and tapped to receive the allen screws 48.

Shims 50 are placed below roller attachment hinges 44 and 46 to adjust a vertical position thereof.

First roller attachment hinge 44 includes a plate portion 52 having a hollow cylindrical portion 54 welded to the back edge thereof at weld 56. Second roller attachment hinge 46 is similarly constructed.

A hinge bar 58 is received within the inner bores of first and second roller attachment hinges 44 and 46. Each end of hinge bar 58 includes a flat surface 60.

Hollow cylindrical part 54 of first roller attachment hinge 44 has two threaded holes in the upper side thereof within which are received allen screws 62 which are utilized as set screws to set against flat surface 60 of hinge bar 58 to fix hinge bar 58 relative to hollow cylindrical part 54.

A roller carrier plate 64 has a hollow cylindrical middle hinge portion 66 attached to a front edge thereof by welding as shown at 68 and 70.

Hinge bar 58 is received through central bore of middle hinge portion 66 which is rotatable relative thereto so that roller carrier plate 64 may be rotatably adjusted about the horizontal longitudinal axis of pivot bar 58 relative to table frame 2.

An adjustment bolt 72 extends upward from table frame 2 and has lower and upper adjustment nuts 74 and 76 threadedly engaged therewith and engaging lower and upper surfaces, respectively, of roller carrier plate 64. Thus, the rotational position of carrier plate 64 about pivot bar 58 may be adjusted by rotating the nuts 74 and 76 upon the threads of adjustment bolt 72.

First and second L-shaped roller support brackets 78 and 80 are attached to roller carrier plate 64 by allen screws 82.

First support bracket 78 includes a shorter horizontal leg 84 and a longer vertical leg 86. Second support bracket 80 is similarly constructed. First and second bearing blocks 88 and 90 are attached to an inner surface 92 of vertical leg 86 of first support bracket 78 by allen screws 94.

A first substantially horizontally extending conically tapered roller 96 includes a shaft 98 extending rearwardly therefrom which is rotatably received within bearing blocks 88 and 90.

Similarly, a second roller 100 has a shaft 102 which is received within bearing blocks 104 and 106 which are attached to second support bracket 80.

In a preferred embodiment of the tapered rollers 96 and 100, the roller 96 has a rear end 108 with a diameter of 2" and has a front end 110 with a diameter of 0.380". Roller 96 has an axial length of 9⅝" between front and rear ends 110 and 108. A hardened tool steel tip insert 112 has a threaded bolt extending rearwardly thereof which is received within threaded and tapped hole 114 in front end 110 of roller 96. Tip insert 112 is tapered continuously along the profile projecting from the outer surface of roller 96.

Second roller 100 is constructed similarly to first roller 96.

As shown in FIG. 3, the innermost or closest edges 116 and 18 of rollers 96 and 100 are oriented parallel to each other and spaced apart by a distance 120 which in a preferred embodiment is ⅛".

Attached to the rear end of shafts 98 and 102 of first and second rollers 96 and 100 are first and second roller drive pulleys 122 and 124, respectively.

An L-shaped idler support bracket 126 having a horizontal leg 128 and a vertical leg 130 is attached to a second roller support bracket 80 by one of the allen screws 82. An idler stub shaft 132 is welded to the vertical leg 130 of idler support bracket 126 at weld 134. Rotatably attached to idler stub shaft 132 is an idler pulley 136.

As is best seen in FIG. 4, there is attached to the bottom of table frame 2 an electric drive motor 138. A shaft 140 extends forwardly of motor 138 and has a motor pulley 142 attached thereto.

As best seen in FIGS. 3 and 5, table frame 2 includes an elongated cut out slot 144 through which an upper portion of motor pulley 142 extends. FIG. 5 is a view along line 5—5 of FIG. 4. An endless drive belt, which preferably has a round cross section, is designated by the numeral 146. Drive belt 146 extends under motor pulley 142 then over first drive pulley 122, then under second drive pulley 124, then over idler pulley 136, then back to motor pulley 142.

In this manner, rotation of motor pulley 142 by electric drive motor 138 causes the tapered rollers 96 and 100 to rotate toward each other from above in opposite directions as indicated by arrows 148 and 150, respectively, in FIG. 5.

Manner of Operation of Rollers of FIGS. 3-5

The manner of operation of the roller assembly 10 is as follows.

A plurality of lamps 12 are placed between the rollers 96 and 100 as they are rotating in the manner previously described. These lamps are initially placed between the rollers near the larger ends thereof approximately at the location of the lamp 12 illustrated in phantom lines in FIG. 3 through which the section line 8—8 is drawn.

These lamps 12 may be fed onto the roller assembly 10 in several ways. They may, for example, be dropped on top of the rollers 96 and 100 by a conveyor, or they may be stored in a large tray mounted above the rollers and may be periodically dropped onto the rollers by hand or by hand-assisted movement down a sloped chute from the storage tray.

When the lamps 12 are initially placed on top of the rollers 96 and 100, they need not be oriented in any particular manner. The orientation is accomplished by the rotating rollers regardless of the initial orientation of the lamp 12 when it is dropped on top of the rollers 96 and 100.

As mentioned above, each of the lamps 12 includes the lamp bulb 14 having a lower bulb portion 22 extending from bulb 14 in a direction parallel to the first axis 36 of the bulb 14. The lower bulb portion 22 has a width 24 in a direction parallel to the second body axis 38 of the bulb, and has a thickness 26 less than the width 24 in a direction parallel to a third body axis 40 of the bulb. The first, second and third body axes of the bulb 14 are mutually perpendicular. The first and second lead wires 32 and 34 extend from the lower bulb portion 22 substantially parallel to the first body axis 36 and spaced apart in a direction parallel to the second axis 38.

When such a bulb is placed between the rollers 96 and 100, those rollers orient the bulb so that its first body axis 36 is vertical, with its lead wires 32 and 34 extending downward from the bulb 14, and so that its second body axis 38 is parallel to a predetermined horizontal line 152. It will be understood that once the first and second body axes are oriented, the orientation of the third body axis 40 is necessarily determined thereby. The predetermined horizontal line 152 is parallel to the innermost edges 116 and 118 of rollers 96 and 100 and lies therebetween as projected onto an imaginary horizontal surface.

This orientation is accomplished in the following manner.

When the bulb 12 is initially placed between the rollers 96 and 100 it may be in any orientation. The sliding movement of the rollers 96 and 100 relative to the glass bulb 14 overcomes any static friction between the bulb 14 and the surface of the rollers and causes the bulb 14 to seek to position itself so that it has a minimum gravitational potential energy. In other words, it will fall to the lowest level possible.

The dimensions of the rollers relative to the bulb 14 are such that the rollers contact the outer surface of cylindrical part 16, and since the end of the bulb 14 from which the lead wires 32 and 34 is the heaviest, with the center of gravity of the entire lamp 12 being in the area of the junction between cylindrical part 16 and flat bulb portion 22, the lead wires 32 and 34 will swing downward between the rollers 96 and 100 thereby giving the lamp 12 an orientation such that its first body axis 36 is vertically oriented with lead wires extending down from the bulb.

Since the lamp 12 can ride lower between the rollers if it is oriented with its second body axis 38 parallel to predetermined line 152 rather than having its third body axis 40 parallel to said predetermined line, and since the lower corners 154 and 156 of lower bulb part 22 are rounded as seen in FIG. 6, the bulb 12 will orient itself with its second body axis 38 parallel to predetermined line 152.

This entire orientation process takes place very quickly, on the order of one second, once the bulb is dropped between the rotating rollers.

Then the oriented bulb 12 migrates from the position through which section line 8—8 is drawn toward the small ends of the rollers. This is because the elevation at which the bulb 14 of lamp 12 contacts the rollers 96 and 100 drops as the bulb moves to the right as shown in FIG. 3. Again, the continued rotation of the rollers 96 and 100 eliminates static friction between those rollers and the bulb and thus the bulb slowly slides down toward the small end of the tapered rollers.

It is preferable that the surface of the rollers 96 and 100 be finished to at least a No. 8 glossy polish so that the glass bulbs slide freely relative thereto and are not crushed between the rollers. It will be understood that with any particular type of electrical component to be aligned by an apparatus such as that of roller assembly 10, it is necessary that the material against which the rollers are sliding be taken into consideration and that the rollers be so constructed and finished as to provide a sufficiently low co-efficient of friction with the electrical component body to prevent the electrical components from being pulled down between the rollers and crushed.

The sloped line of engagement between the bulbs and the rollers causes the rollers to feed the bulbs to the right, as seen in FIGS. 3 and 4, towards a forwardmost position such as is represented by forwardmost bulb 12A, where the bulb is held between the roller tip inserts such as tip insert 112. Further lateral movement to the right of the forwardmost bulb 12A is prevented by a pair of spring wires 158 and 160, the ends of which engage the forwardmost bulb 12A to resiliently retain the bulb 12A from any further lateral movement to the right. Thus, the bulbs 12 will line up contacting each other, and supported against the forwardmost bulb 12A as shown in FIGS. 3 and 4, and as the forwardmost bulb 12A is removed by one of the lamp holders 7 the other bulbs are sequentially fed to said predetermined position in space.

The first spring wire 158 is held in a carrier block 162 which is adjustably attached to a vertical leg 164 of an angle shaped bracket 166 by allen screw 168. A horizontal leg 170 of bracket 166 is horizontally adjustably attached to a mounting plate 172 by an allen screw 174. Mounting plate 172 is attached to table frame 2.

A second spring wire holder assembly 176 is similarly constructed and is attached to second spring wire 160.

Thus, the forwardmost lamp 12A is releasably retained at a predetermined position in space, said predetermined position including a predetermined location in space defined between the small ends of rollers 96 and 100 and laterally defined by engagement of forwardmost bulb 12A with spring wires 158 and 160, and including a predetermined orientation about each of three mutually perpendicular spatial axes so that the first body axis of the bulb 12A is oriented vertically with the second body axis of the bulb 12A oriented parallel to predetermined line 152.

Figure 8:
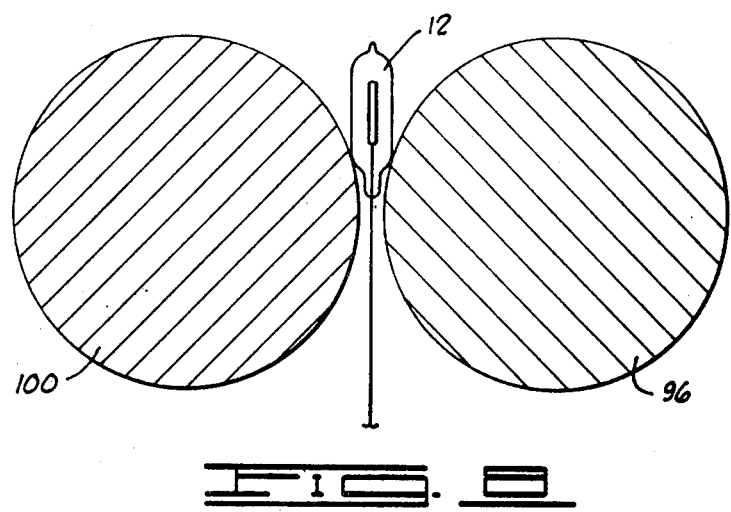
FIGS. 8, 9 and 10 are sectional views taken along lines 8—8, 9—9 and 10—10, respectively, of FIG. 3, illustrating the manner in which a negative glow lamp engages the tapered rollers at each of those locations.
Figure 9:
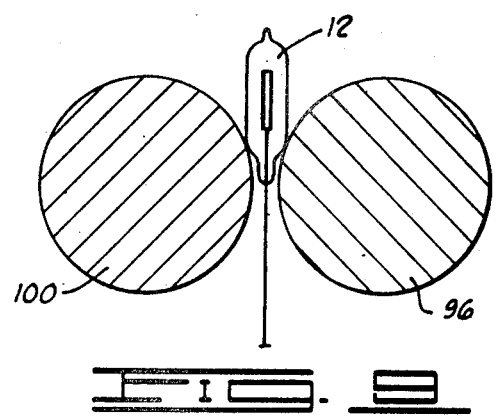
Figure 10:
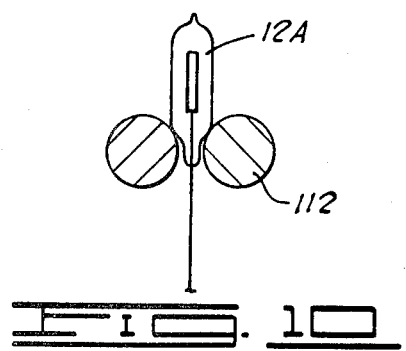
Figure 15:
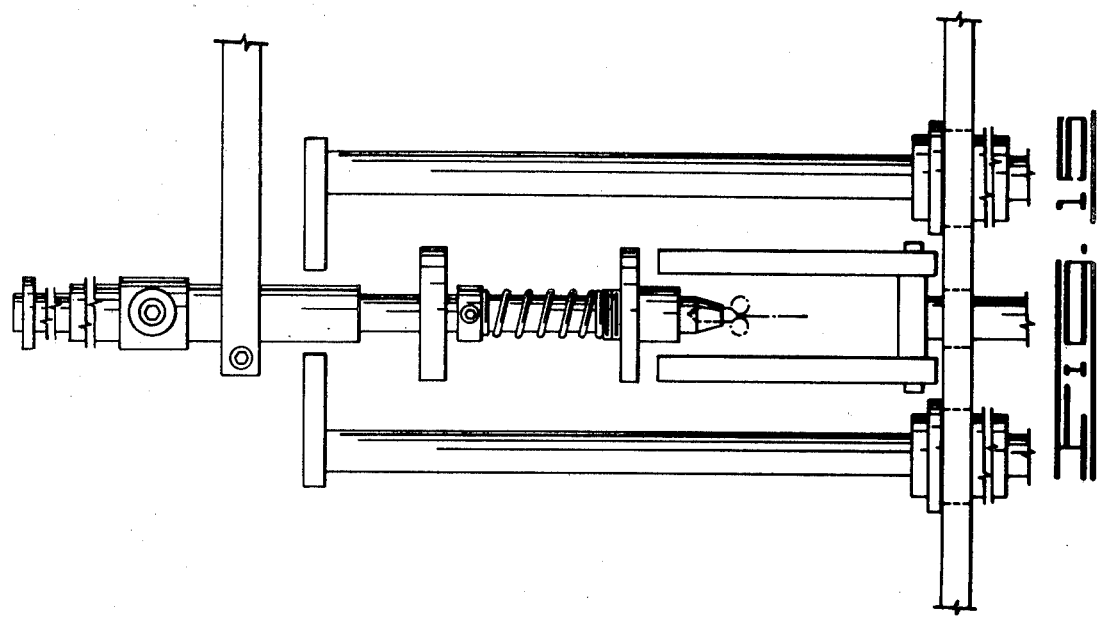

The manner in which the line of contact, between the bulbs 14 and the rollers 96 and 100, slopes downward to the right as the bulbs travel to the right, can best be understood by viewing FIGS. 4, 8, 9 and 10. FIGS. 8, 9 and 10 are section views taken along the sections indicated at FIG. 3.

As best can be seen in FIG. 4, an axis of rotation 178 of first roller 96, which in elevation is parallel to the axis of rotation of roller 100, but which in plan is not as can be seen in FIG. 3, is not horizontally oriented, but rather is tilted downward to the right at a slight angle 180 from the horizontal.

Even if the rollers 96 and 100 were cylindrical rollers, it will be appreciated that if the axis of rotation of those rollers were tilted from the horizontal, then the line of contact of the bulbs with the rollers, which line of contact would be parallel to the axis of rotation, would also be sloped and thus the bulbs could slide down the sloped roller assembly.

With the tapered rollers 96 and 100 of the present invention, another factor is introduced in that, even if the rotational axis such as axis 178 were horizontal, the line of contact between the bulbs 14 and the rollers would still be sloped "downward" toward the small end of the rollers because the bulbs are held at a higher elevation when they are near the large end of the rollers than they are when they are near the small end of the rollers. This can best be appreciated by viewing FIGS. 8, 9 and 10 which illustrate the relative position of bulb 12 as it moves to the right between the rollers 96 and 100.

The line of contact between the bulbs 12 and the roller 96 is designated as 182 in FIG. 4, and it can be seen that the line 182 is not parallel to the axis of rotation 178, but rather the axis 178 and the line 182 converge to the right.

For a given type of electrical component and a given coefficient of friction between that component and the rollers, the line of contact 182 must be sloped sufficiently so that the gravitational force acting upon the electrical components is sufficient to overcome sliding frictional resistance and then the lamps will slide down the rollers. Thus, when rollers 96 and 100 are described as "substantially horizontally extending" it will be understood that their axes of rotation need not be exactly horizontal.

For the glass bulbs 14 of lamps 12 having the dimensions previously described, and for the rollers 96 and 100 having the dimensions previously described and having a No. 8 glossy polish, it is desirable that the axis of rotation 178 be sloped approximately 7°, i.e. the angle 180 should be approximately 7°.

Adjustment bolt 72 provides a means for adjusting the degree of slope of the line of contact 182.

Another important feature provided by the conical taper of rollers 96 and 100 is that the final position of each lamp 12 is between the small ends of the rollers. This makes it much easier to then engage the lamps with one of the lamp holders 7 than it would be if the rollers were not tapered and were instead cylindrical with a diameter equal to that of large end 108. If the rollers were cylindrical with a constant diameter like small end 110, on the other hand, they would be much less effective for initially orienting the lamps. Thus tapered rollers are far superior to cylindrical rollers.

Lamp Holder

Referring now to FIG. 11, a front elevation view of one of the lamp holders 7 and the associated apparatus of work station A is thereshown in the initial position thereof at the time one of the indexing arms 6 first moves to the angular position P1 upon the work table 2. When FIG. 11 is described as a front elevation view, that means that it is viewed as if it were being viewed from angular position P2 looking back toward angular position P1, so that the tapered alignment rollers 96 and 100 are on the opposite side of lamp holder 7 from the viewer.

Lamp holder 7 includes a friction tube 400 which is fixedly clamped to indexing arm 6 by means of an allen screw 402 which tightens a split end (not shown) of indexing arm 6 about friction tube 400.

Slidably received within friction tube 400 is a center rod 404 which has a friction fit within friction tube 400 so that the vertical position of center rod 404 within friction tube 400 is maintained in the absence of any vertical force other than gravity being applied to the center rod 404. In other words, when the center rod 404 is moved to a given position relative to friction tube 400, that position is maintained until the center rod 404 is mechanically engaged and pushed to another position within the friction tube 400.

An upper retaining ring 406 is fixedly attached to center rod 404 near its upper end 408 and a lower retaining ring 410 is fixedly attached to center rod 404 at an intermediate part thereof. Vertical movement of center rod 404 within friction tube 400 is limited at its downwardmost and upwardmost extents by engagement of the upper and lower retaining rings 406 and 410 with upper and lower ends 412 and 414, respectively, of friction tube 400.

Referring now to FIGS. 18–22, the construction of center rod 404 is there further illustrated.

A blind center bore 416 (see FIG. 22) extends axially upward from a lower end 418 of center rod 404 for a distance 420 (see FIG. 18).

The length 420 of the lower portion of center rod 404 is divided into first and second semi-cylindrical halves 422 and 424 by axial planar cuts 426 and 427.

The second semi-cylindrical half 424 is divided into first and second quarter cylindrical portions 428 and 430, respectively, by an axial planar cut 432 (see FIG. 20).

As can be seen in FIGS. 18–20, the axial planar cuts 426 and 432 extend for the same length 420 as does the center bore 416.

These axial planar cuts have divided the lower portion of lamp holder 404 into three downwardly cantilevered spring fingers 422, 428 and 430 which may be compressed radially inwardly to grasp the outer diameter of a lamp 12 within the center bore 416 as is further described below. First, second and third longitudinal grooves 434, 436 and 438 are machined into the outer surface of center rod 404 coincident with the points of communication of axial planar cuts 427, 426 and 432 with the outer surface of center rod 404.

Radial blind bores 440, 442 and 444, each having hemispherical bottoms, are drilled into first, second and third spring fingers 422, 428 and 430 for receiving a ball which closely fits therein. In FIG. 22, bore 440 is shown as having a ball 445 disposed therein. Balls such as 445 may generally be referred to as radial protrusions of the fingers 422, 428 and 430.

An upper portion of center rod 404 has a longitudinal groove 446 therein. This is best seen in FIG. 24, which is a view along line 24—24 of FIG. 11. A handle 447 extends horizontally from friction tube 400. Disposed within handle 447 is a plunger 449 which is biased into the groove 446 by a compression spring 451 which abuts a set screw 453. Plunger 449 is constructed from a rigid fibrous material similar to that from which automobile brake linings are constructed.

Center rod 404 has a constant diameter cylindrical outer surface 448 extending downward from upper end 408 for substantially its entire length except for a short downwardly tapered conical outer surface 450 adjacent lower end 418.

As can be seen in FIGS. 19 and 20, flat spots 452 and 454 are machined on the back sides of second and third spring fingers 428 and 430 for the length of the tapered surface portion 450. These flat spots are very important regarding the function of the center rod 404 as it interrelates with the lamp alignment roller assembly 10. The lamps 12 are aligned between rollers 96 and 100 so that they are vertically oriented and closely packed together. If it were not for the flat spots 452 and 454 on the back side of the spring fingers 428 and 430 of center rod 404, then when center rod 404 was lowered over the forwardmost lamp 12A between the rollers 96 and 100, it would be likely to crush the second forwardmost lamp which was adjacent to the lamp 12A being picked up. This is prevented by the presence of flat spots 452 and 454.

Referring again to FIG. 11, a cam sleeve 456 is received about center rod 404 near the lower end 418 thereof. Received around center rod 404 above cam sleeve 456 is a clamping spring 458 which is a coil compression spring.

The upper end of clamping spring 458 abuts against a spring retaining collar 460, the position of which is fixed relative to center rod 404 by an allen screw 462. The compression of spring 458 may be adjusted by loosening screw 462, moving collar 460, and then tightening screw 462 against center rod 404. Thus, the spring 458 biases the cam sleeve 456 downward relative to the center rod 404. An actuating collar 464 is attached to cam sleeve 456 and extends radially outward therefrom.

The construction of cam sleeve 456 and actuating collar 464 are best seen in FIG. 23 which is a sectional elevation view thereof.

Cam sleeve 456 has a center bore 466 extending downward from the upper end 468 thereof. A counter bore 470 extends upward from a lower end 472, and the bores 466 and 470 are connected by a tapered conical cam surface 474.

The actuating collar 464 is threadedly attached to cam sleeve 456 at threaded connection 476.

When the cam sleeve 456 is assembled with center rod 404 as shown in FIG. 11, the tapered cam surface 474 engages the ball bearings 445 received in radial blind bores 440, 442 and 444 of first, second and third spring fingers 422, 428 and 430. Thus, the downward biasing force from coil spring 458 acting against cam sleeve 456 causes cam surface 474 to press downwardly against the ball bearings 445 thereby urging the ball bearings and their associated spring fingers 422, 428 and 430 radially inward so that a lamp 12 received within the central bore 416 of center rod 404 is clamped therein by the inward bias of the spring fingers. Lamp 12 may be released from the center rod 404 by pushing upward on the actuating collar 464 thereby moving cam sleeve 456 upward relative to center rod 404 so as to move the cam sleeve 474 out of engagement with the ball bearings.

The manner in which the lamp holder 7 is operated at work station A so as to pick up one of the lamps 12 from the lamp alignment roller assembly 10 will now be described with reference to sequential FIGS. 11-15.

Referring now to FIG. 11, the initial position of the lamp holder 7 is shown when it is first moved to angular position P1 by rotation of the indexing arm 6 relative to the work table 2. It is seen that the center rod 404 is in its upwardmost position relative to friction tube 400 so that the lower retaining ring 410 is in engagement with the lower end 414 of friction tube 400. The cam sleeve 456 is biased downward by compression spring 458 so that the spring fingers 422, 428 and 430 are compressed inward.

First and second upper actuating arms 478 and 480 are attached to first and second vertical actuating rods 482 and 484 which extend upward through guide sleeves 486 and 488 attached to and disposed through working table 2. The actuating rods 482 and 484 are connected to a common linkage below working table 2 so that the rods 482 and 484 are fixedly connected together so that they move upwardly or downwardly simultaneously maintaining the first and second actuating arms 478 and 480 at identical elevations.

A third actuating rod 490 extends upward through working table 2 and has a lower actuating assembly 492 attached thereto. Lower actuating assembly 492 includes a center plate 494 attached to the upper end of actuating rod 490.

Figure 17:
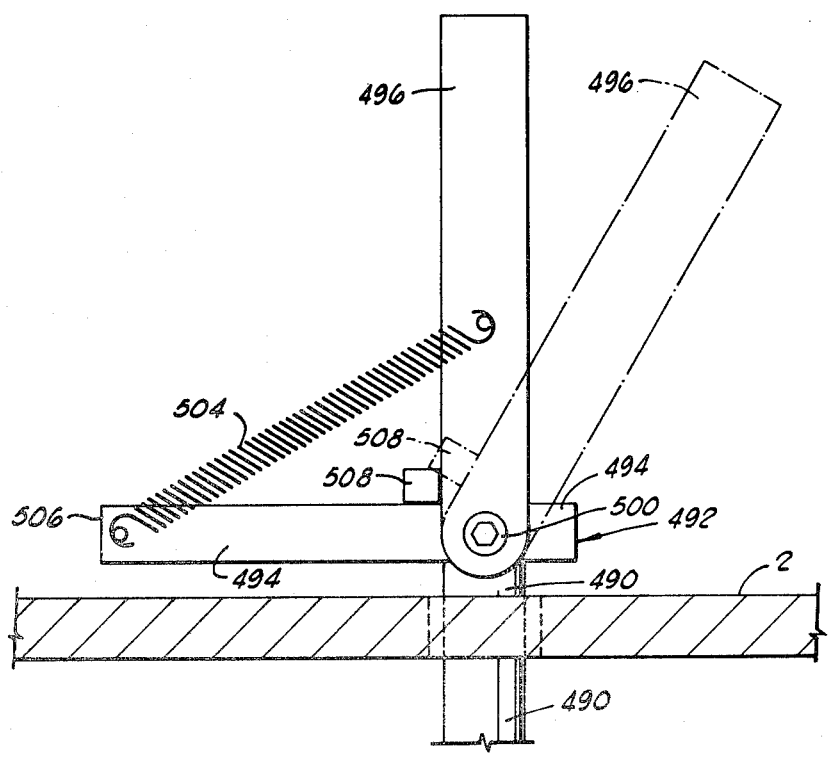
FIG. 17 is a sectional elevation view along line 17—17 of FIG. 11.

The lower actuating assembly 492 is best shown in FIG. 17.

First and second lower actuating arms 492 and 498 are pivotally attached to center plate 494 by pivot pins 500 and 502.

Two coil tension springs 504, only one of which can be seen in FIG. 17, are connected between a rearward end 506 of center plate 494 and each of the lower actuating arms 496 and 498 so as to bias the actuating arms 496 and 498 counterclockwise as seen in FIG. 17.

Each of the lower actuating arms 496 and 498 includes a limit dog 508 fixedly attached to the rear edge thereof for engagement with center plate 494 so as to limit the counterclockwise motion of the lower actuating arms 496 and 498 as seen in FIG. 17 relative to center plate 494. Thus, the lower actuating assembly 492 normally is in the orientation shown in solid lines in FIG. 17. If, however, the actuating arms 496 and 498 should be engaged by an erroneously positioned lamp holder 7, which for example may have accidentally fallen relative to friction tube 400, then the spring loaded lower actuating arms 496 and 498 can merely pivot forward to a position such as that shown in phantom lines in FIG. 17 thereby preventing damage to the lower actuating assembly 492 or the lamp holder 7.

The lower actuating assembly 492 is shown in FIG. 11 in its initial lowermost position relative to work table 2.

The lamp holder 7 will subsequently be actuated by the upper actuating arms 478 and 480 and the lower actuating arms 496 and 498 in such a manner that the cam sleeve 456 is moved upward relative to center rod 404 thereby allowing the spring fingers 422, 428 and 430 to spring outward so that the center rod 404 may be lowered over the lamp 12 so that the lamp 12 is received within the center bore 416 of center rod 404. Then the spring 458 will be allowed to expand thereby moving the cam sleeve 456 downward and clamping the spring fingers 422, 428 and 430 about the lamp 12. Both the lower and upper actuating arms then move out of engagement with the lamp holder 7 which has the lamp 12 securely clamped therein. Then the next rotational indexing motion of the indexing arm 6 attached to the lamp holder 7 at work station A at angular position P1, carries the lamp 12 forward out of the plane of the paper of FIG. 11. Thus, the lamp 12 is engaged and carried away from the lamp alignment roller assembly 10 without any upward or downward motion of the lamp 12.

This all occurs in the following manner.

From the positions shown in FIG. 11, the upper actuating arms 478 and 480 move downward into engagement with the lower retaining ring 410 of lamp holder 112 pulling the center rod 404 downward relative to friction tube 400 to the position shown in FIG. 12. Simultaneously, the lower actuating arms 496 and 498 are moved upward into engagement with the actuating collar 464 to move actuating collar 464 and cam sleeve 456 upward relative to center rod 404 thereby compressing the spring 458 a distance 510 as represented in FIG. 12. This moves the cam surface 474 out of engagement with the ball bearings 445 received within the blind bores 440, 442 and 444 of spring fingers 422, 428 and 430, respectively, so as to allow the spring fingers to spring radially outward.

At this point, a vertical distance 512 is present between the upper actuating arms and the lower actuating arms.

From the position shown in FIG. 12, the upper and lower actuating arms simultaneously move downward at an identical rate so that the distance 512 is constantly maintained until the upper and lower actuating arms reach the position illustrated in FIG. 13, wherein the center bore 416 of center rod 404 is disposed about the forwardmost lamp 12A being held between the tapered rollers 96 and 100. Thus, the actuating arms 478 and 480 may be referred to as a loading means for moving center rod 404 downward relative to lamp 12, with the fingers 422, 428 and 430 in an open position, so that lamp 12 is received in bore 416.

In the position shown in FIG. 13, the spring 458 is still in a compressed state and the spring fingers 422, 428 and 430 have not yet been moved radially inward to clamp the lamp 12 therebetween.

Figure 14:
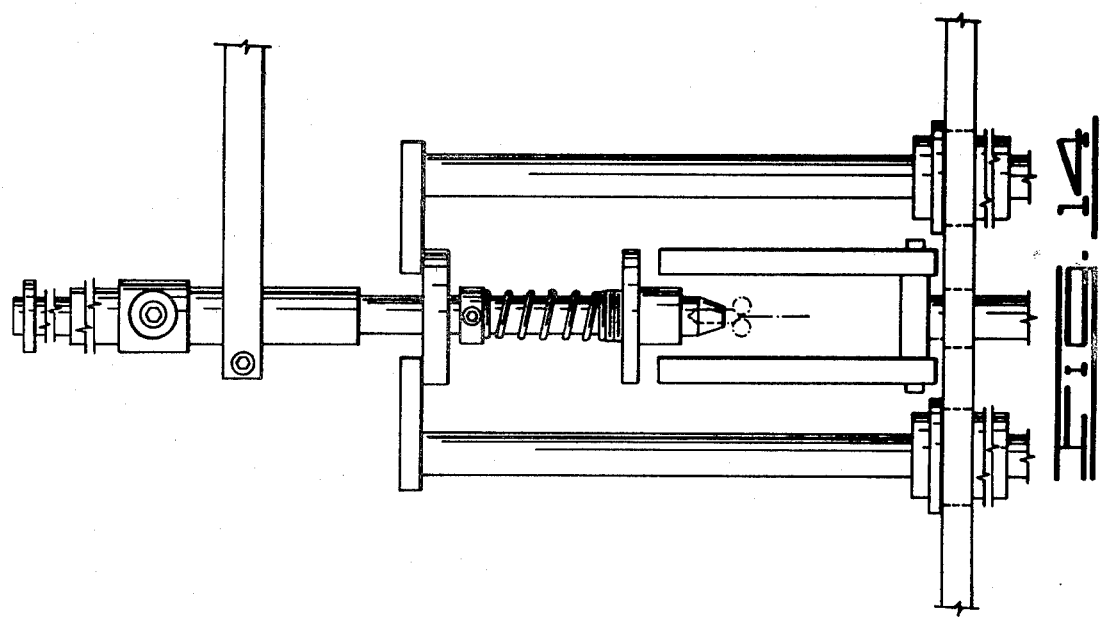

From the position shown in FIG. 13, the lower actuating arms 296 and 298 moved downward to the position shown in FIG. 14. During this movement of the lower actuating arms, the upper actuating arms do not move. Thus, the cam sleeve 456 is allowed to be moved downward relative to the center rod 404 by the downward bias of coil spring 458, thereby urging cam surface 474 against the ball bearings 445 and thus moving the spring fingers 422, 428 and 430 radially inward to clamp the lamp 12 therebetween. Thus the lower actuating arms 496 and 498 may be referred to as a control means, operably associated with center rod 404 and arms 478 and 480 for expanding and contracting fingers 422, 428 and 430.

From the position shown in FIG. 14, the upper actuating arms 478 and 480 once again move upward to their initial position as was first shown in FIG. 11. This ends the operation of the actuating arms at work station A and the lamp 12 is securely clamped within the lamp holder 7.

The next indexing motion of indexing arm 6 will then carry the lamp 12 to angular position P2 above work table 2.

Figure 16:
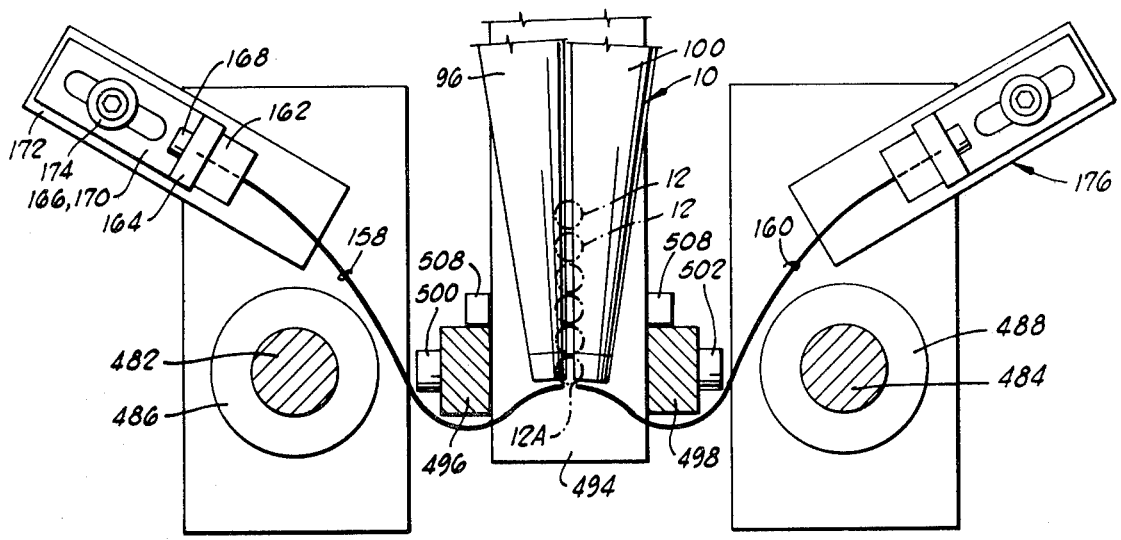
FIG. 16 is a plan view along line 16—16 of FIG. 11 showing the front end of the tapered alignment rollers with the associated structure of FIG. 11.

FIG. 16 is a plan view along line 16—16 of FIG. 11 which illustrates the relative orientation of the lamp alignment roller assembly 10 with the actuating apparatus just described.

In FIGS. 11-15, the center bore 416 of center rod 404 of lamp holder 7 is located directly above the forwardmost lamp 12A being held between the tapered alignment rollers 96 and 100.

As is shown in FIG. 16, the first and second spring wires 158 and 160, previously described with regard to FIG. 3, are placed directly in front of the forwardmost end of rollers 96 and 100 so as to hold the forwardmost lamp 12A between the rollers 96 and 100. After the lamp 12A has been clamped by the lamp holder 7, and when the indexing arm 6 moves toward second angular position P2, the lamp 12A is easily pulled between the spring wires 158 and 160.

The lamp 12 is releasably held within bore 416 of center rod 404 in a fixed position relative to center rod 404.

Alternative Embodiment of a Lamp Holder

Referring now to FIG. 25, an alternative embodiment of a lamp holder system including a lamp holder and means for moving the same is designated by the numeral 600. A table frame 601 is there illustrated with a vertical support shaft 602 extending upward therethrough. The shaft 602 extends through a bearing block 604 which is attached to table frame 601. Extending horizontally from an upper part of shaft 602 is a horizontal bar 606 which has a split end 608 which is held about shaft 602 by a clamping screw 610.

Extending upward from horizontal bar 606 is a vertical fulcrum support 612 to which a transfer arm 614 is pivotally attached at a pivot pin 616.

A rear end 618 of transfer arm 614 is attached to a vertical linkage 620 which extends downward through table frame 601 to a cam operated drive mechanism (not shown). A forward end 622 of transfer arm 614 is pivotally attached to a bracket 624 attached to a center rod 626 of a lamp holder generally designated by the numeral 628. The lamp holder 628 includes a friction tube 630 which is rigidly attached to horizontal arm 606.

Center rod 626 extends through friction tube 630 and has a lower portion 632 which is split into two semicylindrical downward extending fingers 634 and 636 by a vertically extending cut 638 (see FIG. 26). The finger 634 has a notch 640 therein to prevent the second forwardmost lamp 12 from being crushed when the forwardmost lamp 12A is picked from between the rollers of a lamp alignment roller assembly like lamp alignment roller assembly 10 of FIG. 3.

Central rod 626 has a central bore (not shown) therein like bore 416 of FIG. 22. Finger 636 is preferably attached to the remainder of center rod 626 by a pivot pin 642, rather than being cantilevered. This is because of the higher bending stresses encountered when using a fluid power cylinder to flex the finger 636.

Extending horizontally from center rod 626 is an air cylinder support bar 644, a split end 646 of which is clamped about center rod 626 by clamping screw 648.

Attached to a lower side of support bar 644 is an air cylinder 650 which has a piston 652 extending downwardly therefrom which is attached to a cantilever bar 654 which extends horizontally outward from finger 636 to center rod 626 and which is welded to finger 636 at weld 656.

As mentioned, center rod 626 has a center bore extending upward from a lower end 658 thereof for the length of the lower portion 632 of center rod 626. That center bore is dimensioned so that when piston 652 is extended a lamp 12 may be tightly held between fingers 634 and 636, and when air pressure to cylinder 650 is released a return spring 660 pulls finger 636 away from finger 634 to release the lamp 12.

Horizontal movement of a lamp 12 away from rollers 96 and 100 is achieved by rotation of shaft 602.

Thus the lamp handling system of the present invention readily achieves the ends and advantages mentioned as well as those inherent therein. While certain specific embodiments have been illustrated for the present disclosure, numerous changes in the arrangement and construction of parts may be made by those skilled in the art, which changes are encompassed within the scope and spirit of the present invention as defined by the appended claims.

What is claimed is:

1. An apparatus for handling electrical components, comprising:
   a vertically reciprocable rod having a central bore in a lower end thereof for receiving said electrical components one at a time, and having a plurality of vertical slots therethrough communicating with said central bore thereby dividing a lower portion of said rod into a plurality of downward extending fingers;
   a vertically oriented friction tube within which said rod is reciprocably disposed;
   vertical movement means for reciprocating said rod vertically within said friction tube;
   lateral movement means for moving said rod laterally;
   actuating means for moving said downward extending fingers between a radially expanded position wherein one of said electrical components may be received therebetween and a radially contracted position wherein said electrical component is clamped between said fingers, so that said electrical component is fixed relative to said fingers; and
   wherein said friction tube includes friction means for frictionally engaging said rod so that a vertical position of said rod relative to said tube is maintained in the absence of any vertical force other than gravity acting on said rod, and so that said vertical movement means can move said rod vertically within said friction tube.
2. The apparatus of claim 1, wherein:
   said lateral movement means includes a rotatably indexing turret to which said friction tube is attached.
3. The apparatus of claim 2, wherein:
   said actuating means includes a sleeve disposed about said rod and having an inner cam surface engaging a protrusion from each of said fingers, said sleeve being spring biased toward a lower position relative to said rod corresponding to said radially contracted position of said fingers, wherein said fingers are cammed radially inward by said cam surface.
4. The apparatus of claim 1, wherein:
   said actuating means includes a sleeve disposed about said rod and having an inner cam surface engaging a protrusion from each of said fingers, said sleeve being spring biased toward a lower position relative to said rod corresponding to said radially contracted position of said fingers, wherein said fingers are cammed radially inward by said cam surface.
5. The apparatus of claim 1, wherein:
   a lower portion of each of said fingers have downwardly tapered outer surfaces.
6. The apparatus of claim 1, wherein:
   said actuating means includes a fluid powered cylinder having a piston connected to one of said fingers.
7. The apparatus of claim 1, wherein:
   at least one of said fingers has a notch means, disposed in a lower portion of an outer surface of said one finger, for partially receiving therein and thereby preventing crushing of a second electrical component adjacent a first electrical component when said first electrical component is being received in said central bore of said rod.

* * * * *